United States Patent [19]

Furuyama

[11] Patent Number: 4,794,582

[45] Date of Patent: Dec. 27, 1988

[54] METHOD AND APPARATUS FOR PREVENTING DUPLEX RECORDING ON INFORMATION RECORDING MEDIUM

[75] Inventor: Hiroaki Furuyama, Higashiyamato, Japan

[73] Assignee: Teac Corporation, Musashino, Japan

[21] Appl. No.: 40,946

[22] Filed: Apr. 21, 1987

[30] Foreign Application Priority Data

Apr. 25, 1986 [JP] Japan .................................. 61-94641

[51] Int. Cl.$^4$ ............................................. G11B 15/04
[52] U.S. Cl. ........................................ 369/54; 369/50; 369/44; 360/78.04; 360/74.4; 360/60
[58] Field of Search ....................... 369/50, 54, 58, 32, 369/44; 360/33.1, 60, 74.4, 74.5, 77, 78

[56] References Cited

U.S. PATENT DOCUMENTS 4,689,778 8/1987 Miwa et al. ...................... 369/54 X
4,698,702 10/1987 Miyake ........................... 360/74.4 X

FOREIGN PATENT DOCUMENTS 54-140515 10/1979 Japan .

Primary Examiner—Aristotelis M. Psitos
Attorney, Agent, or Firm—Ladas & Parry

[57] ABSTRACT

A method and apparatus for preventing duplex recording on an information recording medium comprising unrecorded tracks and pre-recorded tracks detects an unrecorded track having a starting address where a recording is to be started, detects a first pre-recorded track occurring after the unrecorded track, confirms an address of the first pre-recorded track by reproducing address signals from vicinities of the first pre-recorded track, records an information signal on unrecorded tracks occurring after the unrecorded track having the starting address, and forcibly stops the recording of the information signal at an unrecorded track having an address which is one less than the address of the first pre-recorded track.

12 Claims, 4 Drawing Sheets

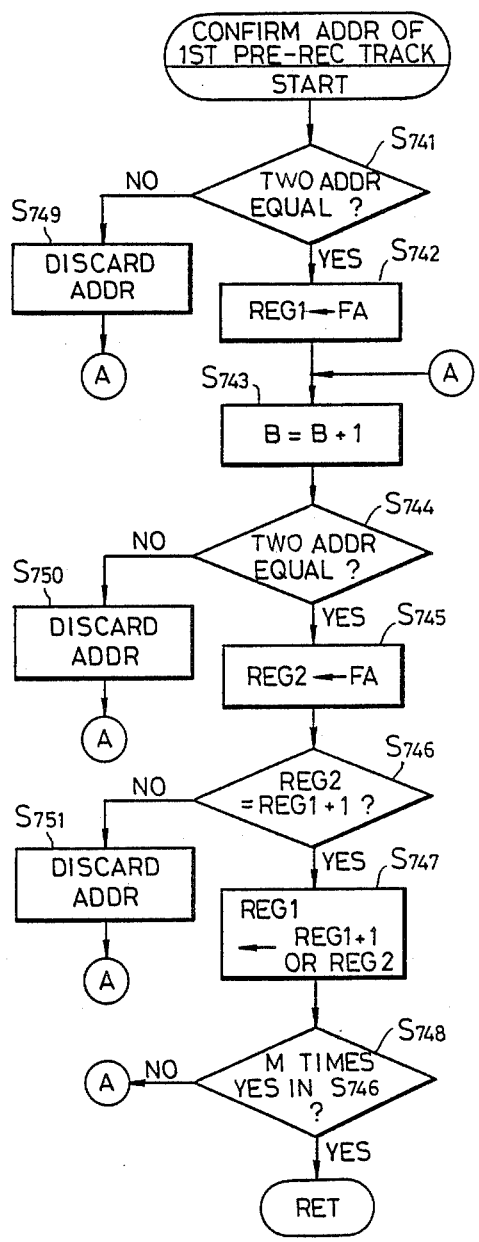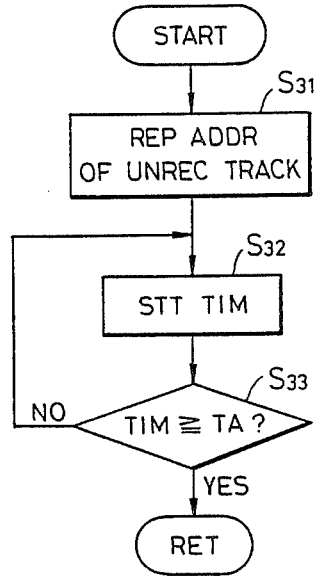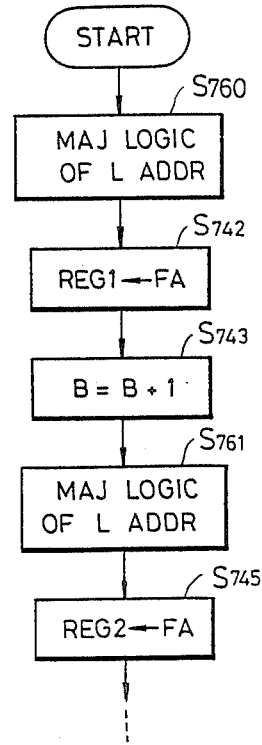

METHOD AND APPARATUS FOR PREVENTING DUPLEX RECORDING ON INFORMATION RECORDING MEDIUM

BACKGROUND OF THE INVENTION

The present invention generally relates to method and apparatus for preventing duplex recording on information recording mediums, and more particularly to a method and apparatus for preventing duplex recording of an information signal in a portion of an information recording medium pre-recorded with an address signal and another information signal.

There are information recording mediums pre-recorded with an address signal before an information signal is recorded thereon, and information recording mediums recorded with an information signal together with an address signal. In such information recording mediums, it is not only possible to record an information signal on successive tracks, but it is also possible to skip a predetermined number of tracks and leave unrecorded tracks which may be later recorded with another information signal. It is possible to divide a total recording region of the information recording medium into a plurality of divided regions which are to be recorded with different kinds of information signals, so that the recording can be carried out for each kind of information signal. In other words, the information signals may be recorded on these information recording mediums in a variety of ways.

However, when recording the information signals on the information recording mediums in the variety of ways, it is necessary to accurately discriminate the pre-recorded tracks and the unrecorded tracks so as to prevent a duplex recording in which an information signal is erroneously recorded on a pre-recorded track which is pre-recorded with another information signal. It is essential that the duplex recording is prevented in a type of an information recording medium which can be recorded only once with an information signal, because the signal recorded on the pre-recorded track of this type of information recording medium cannot be erased. In other words, if the information signal is newly recorded on the pre-recorded track which is recorded with the previously recorded information signal, both the previously recorded information signal and the newly recorded information signal will be destroyed and neither the previously recorded information signal nor the newly recorded information signal can be reproduced at the time of a reproduction.

In order to prevent the duplex recording, there is a conventional recording apparatus provided with detection head which leads a recording head along a scanning direction of the recording head. According to this conventional recording apparatus, a warning is displayed when the detection head detects the pre-recorded track. The recording head itself is shifted mechanically or the channel of the recording head is switched over so as to record the information signal on only the unrecorded track. For example, a recording apparatus of this type is disclosed in a Japanese Laid-Open Patent Application No. 54-140515.

However, the conventional recording apparatus detects the unrecorded track by simply detecting whether or not a reproduced output signal is obtained from the detection head. For this reason, the pre-recorded track and the unrecorded track cannot be discrimnnated from each other with a high accuracy. But in order to prevent the duplex recording, it is absolutely necessary that the discrimination between the pre-recorded track and the unrecorded track is accurately carried out at a border where the track changes from the pre-recorded track to the unrecorded track or vice versa.

SUMMARY OF THE INVENTION

Accordingly, it is a general object of the present invention to provide a novel and useful method and apparatus for preventing duplex recording on information recording medium, in which the problems described heretofore are eliminated.

Another and more specific object of the present invention is to provide a method and apparatus for preventing duplex recording on information recording medium, wherein an unrecorded track having a starting address where a recording is to be started is detected, a first pre-recorded track occurring after the unrecorded track is detected, an address of the first pre-recorded track is confirmed by reproducing address signals from vicinities of the first pre-recorded track, an information signal is recorded on unrecorded tracks occurring after the unrecorded track having the starting address, and the recording of the information signal is forcibly stopped at an unrecorded track having an address which is one less than the address of the first pre-recorded track. According to the method and apparatus of the present invention, it is possible to positively prevent a duplex recording on the pre-recorded tracks. It is possible to record the information signal even when it is unknown whether or not a recording capacity (frame number) of a recording region comprising successive unrecorded tracks is smaller than, equal to or larger than a recording capacity required to record the information signal. Furthermore, even when the recording capacity required to record the information signal is greater than the recording capacity of the recording region comprising the successive unrecorded tracks, it is possible to record the information signal amounting to the recording capacity of the recording region and prevent the recording of the information signal on pre-recorded tracks following the recording region.

Other objects and further features of the present invention will be apparent from the following detailed description when read in conjunction with the accompanying drawings.

BRIEF DESCRIPTION OF THE DRAWINGS

FIG. 6 is a flow chart for explaining an embodiment of a part of the flow chart shown in FIG. 4;

FIG. 7 is a flow chart for explaining a modification of a part of the flow chart shown in FIG. 6; and FIG. 8 is a flow chart for explaining an embodiment of a part of the flow chart shown in FIG. 3 for a CLV system disc.

DETAILED DESCRIPTION

Figure 1:
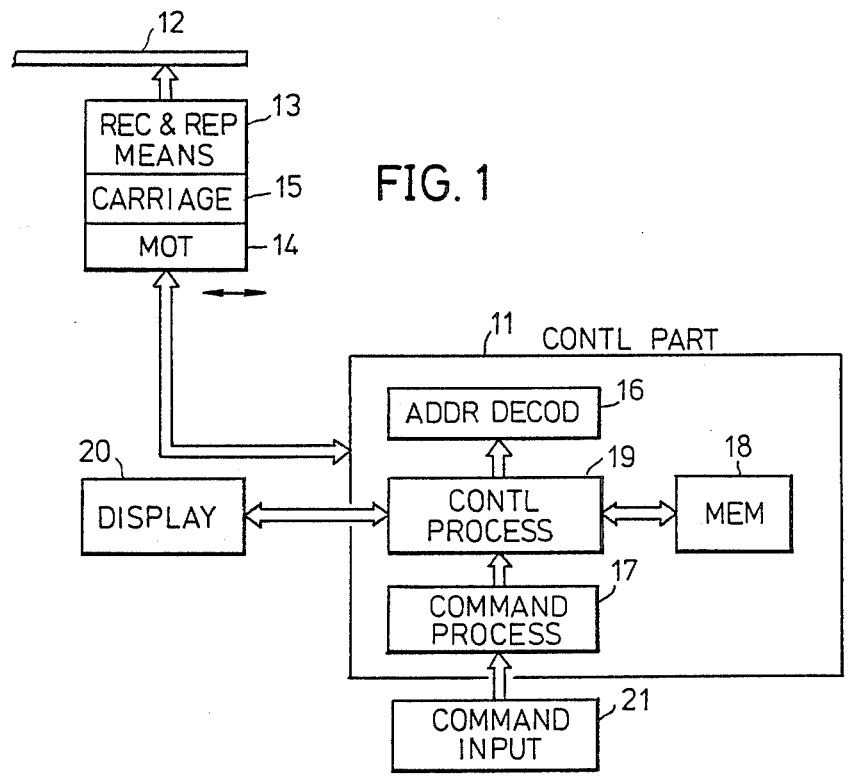
FIG. 1 is a system block diagram showing an embodiment of a recording and reproducing apparatus which may be applied with the method and apparatus for preventing duplex recording on information recording medium.

FIG. 1 shows an embodiment of a disc recording and reproducing apparatus which may be applied with the method and apparatus for preventing duplex recording according to the present invention. In the present embodiment, it is assumed that a disc 12 is used as an information recording medium. In FIG. 1 an information signal such as a video signal can be recorded only once on the disc 12 by use of a main light beam from an optical recording and reproducing means 13. A signal recorded on a pre-recorded track of this disc 12 cannot be erased. In other words, if an information signal is newly recorded on a pre-recorded track which is recorded with a previously recorded information signal, both the previously recorded information signal and the newly recorded information signal will be destroyed and neither the previously recorded information signal nor the newly recorded information signal can be reproduced by the optical recording and reproducing means 13 at the time of a reproduction. For this reason, it is impossible to perform a duplex recording in which an information signal is recorded on a pre-recorded track of the disc 12, and it is necessary to prevent the duplex recording.

The optical recording and reproducing means 13 is moved in a radial direction of the disc 12 together with a carriage 15 which is fed in the radial direction of the disc 12, depending on a rotation of a stepping motor 14 which is rotated under a control of an output control signal of a control part 11 and drives the carriage 15. The control part 11 comprises an address decoder 16, a command processing part 17, a memory part 18 and a control processing part 19 for processing various operations and controls.

The control processing part 19 is supplied with reproduced address data from the address decoder 16 and data from the command processing part 17, and performs data transfer between the memory part 18. Various output control signals of the control part 11 is produced from the control processing part 19. The output control signals of the control part 11 are supplied to the stepping motor 14 and a display part 20 for displaying various messages. Commands from a user's command input part 21 such as a remote controller and an external controller are supplied to the command processing part 17 of the control part 11. In addition, a reproduced address signal which is reproduced from the disc 12 by the optical recording and reproducing means 13 is supplied to the address decoder 16 of the control part 11. In FIG. 1, it is assumed that a transmission path between the stepping motor 14 and the control part 11 includes a transmission path for the reproduced signals from the optical recording and reproducing means 13.

The disc 12 is rotated by a disc motor (not shown). As is well known, the rotation of the disc 12 may be in accordance with the constant angular velocity (CAV) system or the constant linear velocity (CLV) system. For convenience' sake, it will be assumed that the disc 12 is provided with a guide track (pre-formed pits) as in the case of the disc previously proposed in a U.S. patent application Ser. No. 873,407 filed June 12, 1986 in which the assignee is the same as the assignee of the present application. In addition, it will be assumed that the disc 12 is recorded with an address signal between the pre-formed pits as previously proposed in a U.S. patent application Ser. No. 917,188 filed Oct. 9, 1986 in which the assignee is the same as the assignee of the present application.

In other words, a recording surface of the disc 12 is divided into a plurality of imaginary equiangular sectoral regions, and a guide track comprising a spiral track or concentric tracks is formed on the recording surface so that each track turn of the guide track is constituted by a row of pits formed in every other of the equiangular sectoral regions, and the pit is only formed in one of two mutually adjacent track turns of the guide track in each of the equiangular sectoral regions so that the pits are formed in every other track turns of the guide track in a radial direction of the disc in each of the equiangular sectoral regions. An intermediate part between center lines of the two mutually adjacent track turns of the guide track is used for forming an information signal recording track for an information signal at the time of a recording.

Figure 2:
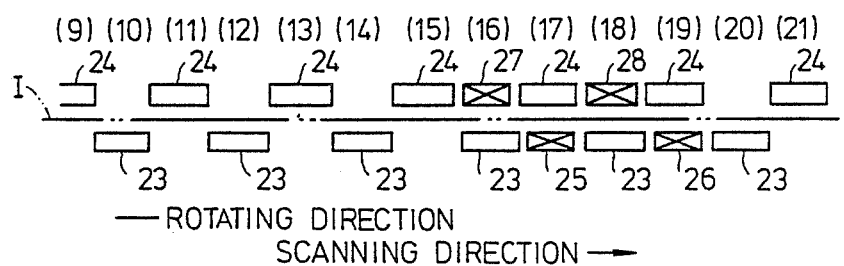
FIG. 2 is a plan view showing an essential part of a disc which may be played on the recording and reproducing apparatus shown in FIG. 1.

In FIG. 2, a two-dot chain line I indicates a center line of an information signal recording track formed on the CAV system disc 12 which is to be rotated at a constant angular velocity. Pre-formed pits 23 of a track turn of the guide track are formed for every other 1H (one horizontal scanning period) on the lower side of the two-dot chain line I (that is, inner peripheral side of the disc), and pre-formed pits 24 of a track turn of the guide track are formed for every other 1H on the upper side of the two-dot chain line I (that is, outer peripheral side of the disc). The disc 12 comprises a recording surface which is divided into a plurality of equiangular sectoral regions and a guide track formed on the recording surface, where each track turn of the guide track is constituted by a row of intermittent pits 23 (or 24) formed in every other equiangular sectoral regions, and the pit 23 (24) is only formed in one of two mutually adjacent track turns of the guide track in each equiangular sectoral region so that the pits 23 (or 24) are formed in every other track turns in a radial direction of the disc 12 in each equiangular sectoral region.

In FIG. 2, portions 25 through 28 indicated with an "X" mark indicate recording portions where an address signal is pre-recorded. In the track turn of the guide track on the inner peripheral side of the disc 12, the recording portions 25 and 26 are respectively arranged between two pits 23. Similarly, in the track turn of the guide track on the outer peripheral side of the disc 12, the recording portions 27 and 28 are respectively arranged between two pits 24. In other words, address signals containing identical address information are pre-recorded at two positions in each track turn of the guide track when the disc 12 is produced, so as to enable an address error checking. The address signals recorded in the recording portions 25 through 28 are respectively constituted by digital data having a predetermined signal format. The address signal is modulated according to a predetermined modulation system such as the phase encoding (PE) before being recorded on the disc 12.

The recording portions 25 through 28 are scanned by sub light beams of the optical recording and reproducing means 13 to reproduce the address signals when recording the information signal on the disc 12. The disc motor and the rotational phase of the disc 12 are controlled responsive to an error voltage which is obtained by comparing the phase of a pulse signal which rises in synchronism with an edge of the address signal first reproduced from the recording portion 27 and the phase of a pulse signal which is produced from a frame pulse signal. The information signal is recorded at the position indicated by the two-dot chain line I at the rate of two fields (that is, one frame) per one revolution of the disc 12 by the main light beam of the optical recording and reproducing means 13. The numbers in brackets in FIG. 2 indicate scanning line numbers of a composite video signal within the information signal.

Since the recording portions 25 and 26 (or 27 and 28) are recorded with the address signals which indicate the track number of the information signal recording track indicated by the two-dot chain line I in FIG. 2, identical address signals are reproduced two times in one revolution of the disc 12. The track number also indicates a frame number, and the track number is also referred to as a frame address for this reason.

Next, a description will be given on the embodiment of the operation of the control part 11 for the case where a microcomputer is used therefor, by referring to FIG. 3. A step S1 discriminates whether or not the disc recording and reproducing apparatus is in a reproducing mode. When the discrimination result in the step S1 is NO, a step S2 sets the mode of the disc recording and reproducing apparatus to the reproducing mode after the disc 12 which is to be played is loaded into the disc recording and reproducing apparatus. On the other hand, when the discrimination result in th step S1 is YES, a step S3 searches for an unrecorded track on the disc 12 having a starting address where the recording is to start.

In the case where the user knows beforehand the track number (frame address) of the unrecorded track having the starting address where the recording is to start, the user enters the track number from the user's command input part 21 so that the starting address is searched in a search mode of the disc recording and reproducing apparatus. But when the user does not know the pre-recorded/unrecorded state of the disc 12 and wishes to determine the starting address after checking what kind of information (pictures) is pre-recorded on which portion of the disc 12, the disc recording and reproducing apparatus is set to a scan mode, a high-speed reproduction mode, a normal reproduction mode, a stepping reproduction mode and the like. In the scan mode, the disc recording and reproducing apparatus simply detects whether or not pre-recorded tracks exist on the disc. On the other hand, when the user does not know the pre-recorded/unrecorded state of the disc 12 and wishes to record the information signal after finding unrecorded tracks sufficient for recording all frames of the information signal, the search for the sufficient number of unrecorded tracks is carried out and a display related thereto is made on the display part 20.

Next, a step S4 discriminates whether or not the searched track at the starting address is an unrecorded track based on the existence of a reproduced radio frequency (RF) signal obtained from the optical recording and reproducing means 13. When the searched track is a pre-recorded track and the discrimination result in the step S4 is NO, the operation returns to the step S3 so as to carry out the search again.

When the searched track at the starting address is an unrecorded track and the discrimination result in the step S4 is YES, a step S5 starts preparations to start recording of the information signal. A step S6 discriminates whether or not servo systems of the disc recording and reproducing apparatus are operational and whether or not the information signal which is to be recorded is received. The step S6 is performed until the discrimination result therein becomes YES. When the discrimination result in the step S6 becomes YES, a step S7 detects a recordable frame number.

Figure 3:
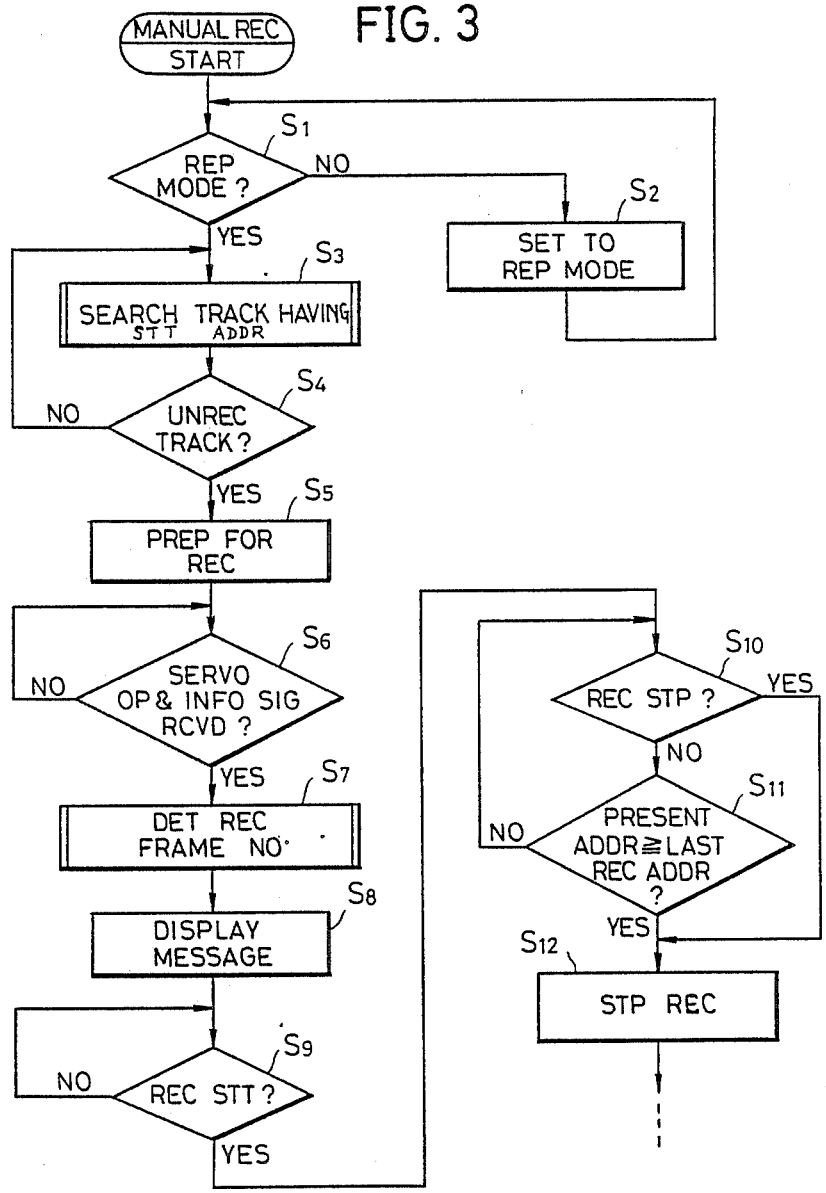
FIG. 3 is a flow chart for explaining an embodiment of the operation of a control part in the recording and reproducing apparatus shown in FIG. 1.
Figure 4:
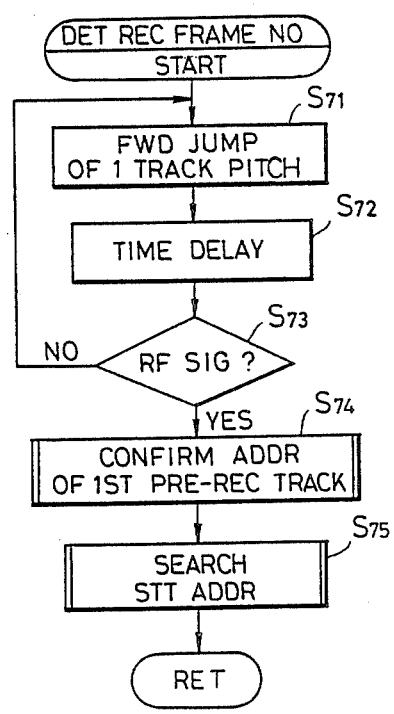
FIG. 4 is a flow chart for explaining an embodiment of an essential part of the flow chart shown in FIG. 3.

FIG. 4 shows an embodiment of a routine carried out by the control part 11 in the step S7 shown in FIG. 3. In FIG. 4, a step S71 produces a control signal which is supplied to the stepping motor 14 for causing the optical recording and reproducing means 13 to jump one track pitch in a forward direction, for example. A step S72 provides a time delay of 1 msec to 1.5 msec, for example, so as to take into consideration the time it takes for the tracking to stabilize and the time it takes for the reproduced RF signal to stabilize. A step S73 discriminates whether or not there is a reproduced RF signal. The operation returns to the step S71 when the discrimination result in the step S73 is NO, so that the steps S71 and S72 are repeated until the discrimination result in the step S73 becomes YES.

The information signal such as the composite video signal is frequency-modulated and recorded on the pre-recorded tracks of the disc 12. Hence, an envelope level of the reproduced frequency modulated (FM) signal (reproduced RF signal) is large when the pre-recorded track is scanned, but the envelope level of the reproduced FM signal (reproduced RF signal) is substantially zero when the unrecorded track is scanned. Hence, as is well known, it is possible to discriminate whether a scanned track is a pre-recorded track or an unrecorded track by detecting the existence of the reproduced RF signal, that is, by detecting the envelope level of the reproduced FM signal.

Figure 5:
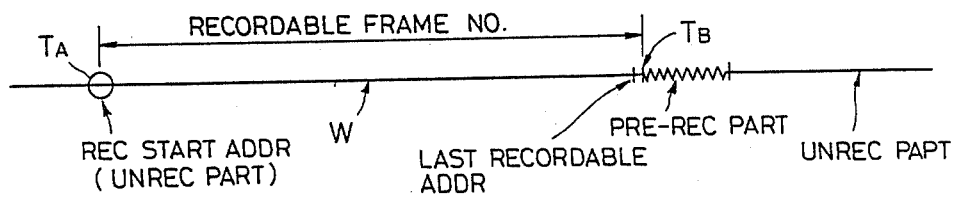
FIG. 5 is a diagram for explaining a recordable frame number.

By carrying out the steps S71 through S73, it is possible to detect a group of unrecorded tracks in a region W after (for example, on the outer peripheral side of the disc 12) the unrecorded track $T_A$ having the starting address as shown in FIG. 5, together with a first pre-recorded track $T_B$ adjacent to the unrecorded track of the region W or pre-recorded tracks in a vicinity of the pre-recorded track $T_B$. The number of unrecorded tracks in the region W indicates the recordable frame number.

Normally, the reproduced RF signal detected in the step S73 is reproduced from the first pre-recorded track $T_B$. However, there is a possibility that the reproduced RF signal detected in the step S73 is reproduced from one of pre-recorded tracks occurring after the pre-recorded track $T_B$ due to signal dropout and the like. On the other hand, in order to prevent the duplex recording on the disc 12, it is absolutely necessary that no error exists in the recordable frame number which is detected.

Therefore, in the present embodiment, a step S74 confirms the frame address of the first pre-recorded track $T_B$. In other words, the step S74 detects the frame addresses of the first pre-recorded track and a predetermined number of pre-recorded tracks in the vicinity of the detected first pre-recorded track $T_B$, and discriminates whether or not the detected frame addresses of the pre-recorded tracks are reliable.

FIG. 6 shows an embodiment of a routine carried out in the step S74 shown in FIG. 4. In FIG. 6, a step S741 compares the two address signals which are successively reproduced from the first pre-recorded track $T_B$ after the unrecorded track $T_A$ at the starting address and discriminates whether or not the frame address contained in the two reproduced address signals coincide.

The two address signals reproduced from the first pre-recorded track $T_B$ should ideally contain the same frame address. When the discrimination result in the step S741 is YES, a step S742 stores an address information FA (for example, a frame address n) contained in the reproduced address signals into a first register REG1 within the memory part 8 shown in FIG. 1. Next, a step S743 produces a control signal which is supplied to the stepping motor 14 for causing the optical recording and reproducing means 13 to jump one track pitch in the forward direction, that is, increments B by one. In this case, the step S743 produces a control signal for causing the optical recording and reproducing means 13 to jump to a pre-recorded track $T_{B+1}$ which is adjacent to the first pre-recorded track $T_B$. A step S744 compares the two address signals which are successively reproduced from the pre-recorded track $T_{B+1}$ and discriminates whether or not the frame address contained in the two reproduced address signals coincide. The two address signals reproduced from the pre-recorded track $T_{B+1}$ should ideally contain the same frame address. When the discrimination resllt in the step S744 is YES, a step S745 stores an address information FA (for example, a frame address n+1) contained in the reproduced address signals into a second register REG2 within the memory part 18 shown in FIG. 1.

Next, a step S746 discriminates whether or not the frame address (n+1) stored in the second register REG2 coincides with a certain frame address which is obtained by incrementing the frame address (n) stored in the first register REG1 by one. When the discrimination result in the step S746 is YES, a step S747 stores the certain frame address (or the frame address (n+1) stored in the second register REG2) into the first register REG1. A step S748 discriminates whether or not the discrimination result YES is obtained in the step S746 M times, and the operation advances to the step S75 shown in FIG. 4 when the discrimination result in the step S748 is YES.

On the other hand, when the discrimination result in the step S748 is NO, the operation returns to the step S743 and the steps S743 through S748 are repeated. Accordingly, the second time the steps S743 through S748 are carried out, the step S743 produces a control signal for causing the optical recording and reproducing means 13 to jump from the pre-recorded track $T_{B+1}$ to a pre-recorded track $T_{B+2}$ which is adjacent to the pre-recorded track $T_{B+1}$. The step S744 compares the two address signals which are successively reproduced from the pre-recorded track $T_{B+2}$ and discriminates whether or not the frame address contained in the two reproduced address signals coincide. When the discrimination result in the step S744 is YES, the step S745 stores an address information FA (for example, a frame address n+2) contained in the reproduced address signals into the second register REG2 within the memory part 18. The step S746 discriminates whether or not the frame address (n+2) stored in the second register REG2 coincides with a certain frame address which is obtained by incrementing the frame address (n+1) stored in the first register REG1 by one. When the discrimination result in the step S746 is YES, the step S747 stores the certain frame address (or the frame address (n+2) stored in the second register REG2) into the first register REG1. The step S748 discriminates whether or not the discrimination result YES is obtained in the step S746 M times.

The steps S743 through S748 are carried out M times, that is, for a predetermined number of pre-recorded tracks, because even when the two frame addresses reproduced from one pre-recorded track coincide, the two frame addresses may coincide by chance due to errors in corresponding bits of the two frame addresses. Thus, it is possible to eliminate the erroneous detection of the coincidence of the two frame addresses from one pre-recorded track.

When the two frame addresses do not coincide in the steps S741, S744 and S746, the frame address is not stored in the registers REG1 and REG2 of the memory part 18, and the reproduced frame address is discarded in corresponding steps S749, S750 and S751. It is discriminated that the frame address n of the first pre-recorded track $T_B$ is reliable only when the two frame addresses reproduced from each of the pre-recorded tracks in the vicinity of the first pre-recorded track $T_B$ coincide M times, where M is preset according to the bit error rate. Thereafter, the operation advances to a step S75 shown in FIG. 4 to start a search for the starting address.

FIG. 7 shows a modification of a part of the flow chart shown in FIG. 6. In FIG. 7, those parts which are the same as those corresponding parts in FIG. 6 are designated by the same reference numerals, and illustration and description thereof will be omitted. When the same address information FA (frame address) is recorded L times in one pre-recorded track, where L is an integer greater than or equal to two, a step S760 carries out a majority logic operation on each of m bits of the L address signals reproduced from the first pre-recorded track $T_B$, for example. Accordingly, the step S724 stores a result of the majority logic operation into the first register REG1 as the frame address n reproduced from the first pre-recorded track $T_B$. Similarly, a step S761 carries out a majority logic operation on each of m bis of the L address signals reproduced from the adjacent pre-recorded track $T_{B+1}$. Accordingly, the step S745 stores a result of the majority logic operation into the second register REG2 as the frame address n+1 reproduced from the pre-recorded track $T_{B+1}$.

Returning now to the description of FIG. 3, a step S8 supplies a control signal to the display part 20 so as to display a message indicating that the disc recording and reproducing apparatus is ready to start the recording operation, after the recordable frame number is detected in the step S7. Then, the user manipulates a predetermined key of the user's command input part 21 at a time when the picture from which the recording is to be started is reproduced on a monitoring receiver (not shown) which is also supplied with the information signal (composite video signal) which is to be recorded. A step S9 waits for the manipulation of the predetermined key, so as to discriminate whether or not the recording operation is to be started. When the discriination result in the step S9 becomes YES, the recording of the information signal on the unrecorded tracks of the disc 12 is carried out by the main light beam of the optical recording and reproducing means 13 while producing in real-time the address signals by the sub light beams of the optical recording and reproducing means 13. A step S10 discriminates whether or not a recording stop switch of the user's command input part 21 is pushed, so as to discriminate whether or not the recording operation is to be stopped. When the discrimination result in the step S10 is NO, a step S11 discriminates whether or not the frame address of the unrecorded track which is presently being recorded is greater than or equal to the frame address of the unrecorded track (last recordable address of the unrecorded track) which is one less than the frame address of the first pre-recorded track $T_B$ detected and confirmed in the step S7 described before. When the discrimination result in the step S10 or S11 becomes YES, a step S12 stops the recording operation at a time when the recording of the frame which is presently being recorded finishes.

By providing the step S11 which carries out the discrimination described above, it is possible to stop the recording operation and prevent the duplex recording on the disc 12 not only when the last recordable address is reached during the recording in a normal state, but also when the carriage 15 is moved by external shock or the like and the optical recording and reproducing means 13 jumps to a pre-recorded track beyond the region W.

After the step S12 shown in FIG. 3 the operation mode of the disc recording and reproducing apparatus may either be changed to the next recording mode or a reproduction mode, for example. Steps which follow the step S12 are not directly related to the subject matter of the present invention, and illustration and description thereof will be omitted.

According to the present embodiment, the information signal is only recorded on the group of unrecorded tracks in the region W amounting to the recordable frame number starting from the unrecorded track having the starting address. Accordingly, even when it is known beforehand that the information signal which is to be recorded amounts to a number of frames greater than the recordable frame number, the recording start instruction is not invalidated. On the contrary, the recording start instruction is detected as a valid instruction and the recording of the information signal is carried out for at least the recordable frame number so that the unrecorded tracks on the disc 12 are utilized efficiently. As for the information signal portion amounting to the number of frames in excess to the recordable frame number, it is possible to record the information signal portion on the next region comprising a group of unrecorded tracks.

According to the present embodiment, it is possible to record the information signal on the disc 12 even in a case where it is unknown beforehand whether the information signal which is to be recorded amounts to a number of frames smaller than, equal to or greater than the recordable frame number. Hence, the method and apparatus according to the present invention is especially effective in such a case. Even in this case, it is possible to positively prevent the duplex recording on the disc 12.

The present invention is not limited to the embodiments described heretofore, and the address signal may be recorded in pits of a guide track formed on the disc or recorde in a groove pre-formed on the disc. It is not essential that the address signal is recorded in the form of pits.

In the case of the CLV system disc 12 which is to be rotated at a constant linear velocity, the address signal is recorded on the pre-recorded tracks by being multiplexed within vertical blanking periods of the video signal, for example. Furthermore, an address signal containing an address information which is incremented by one for each revolution of the disc is recorded in a lead-in region of the disc. In the case of the CLV disc 12 having no address signal pre-recorded on the unrecorded track, the step S3 shown in FIG. 3 must search for an unrecorded track on the CLV system disc 12 having the starting address where the recording is to start with reference to a pre-recorded address signal on a pre-recorded reference track.

FIG. 8 shows an embodiment of a routine carried out in the step S3 shown in FIG. 3 for the CLV system disc 12. A step S31 reproduces a pre-recorded address signal from a pre-recorded reference track on the CLV system disc 12. When pre-recorded tracks exist on the CLV system disc 12, the pre-recorded reference track may be any one of the pre-recorded tracks. On the other hand, when no pre-recorded tracks exist on the CLV system disc 12, a tack turn in the lead-in region may be used as the pre-recorded reference track. A step S32 starts a timer TIM in the control part 11. When the starting address is known, it is possible to calculate a time TA it takes for the optical recording and reproducing means 13 to reach a starting address position on the CLV system disc 12 from the pre-recorded reference track. A step S33 discriminates whether or not a time in the timer TIM is greater than or equal to the time TA. The operation advances to the step S4 shown in FIG. 3 or a step similar thereto. Steps S4 through S12 may be modified according to the needs for the CLV system disc 12, but description thereof will be omitted in the present specification.

The disc 12 is used as the information recording medium in the embodiments described heretofore, but the information recording medium may be a tape, a card and the like.

Further, the present invention is not limited to these embodiments, but various variations and modifications may be made without departing from the scope of the present invention.

What is claimed is:

1. A method of preventing a duplex recording on an information recording medium, said information recording medium comprising unrecorded tracks which are not recorded with an information signal and pre-recorded tracks which are pre-recorded with an information signal, said duplex recording being an operation in which an information signal is erroneously recorded on said pre-recorded tracks, said method comprising the steps of: detecting a predetermined unrecorded track having a starting address where a recording is to be started on said information recording medium;

detecting a first pre-recorded track occurring after said predetermined unrecorded track based on a signal reproduced from said first pre-recorded track;

confirming an address of said first pre-recorded track from consecutive addresses reproduced from signals which are reproduced from said first pre-recorded track and a predetermined number of pre-recorded tracks following said first pre-recorded track;

recording an information signal on said predetermined unrecorded track and unrecorded tracks following said predetermined unrecorded track; and forcibly stopping the recording of the information signal at an unrecorded track having an address which is one less than the address of said first pre-recorded track.

2. A method of preventing a duplex recording on an information recording medium as claimed in claim 1 in which said address is recorded a plurality of times on the pre-recorded tracks so that address values are identical in one pre-recorded track, said step of confirming the address of said first pre-recorded track comprising a substep of validating an address of the pre-recorded track only when address values within a signal which is reproduced from the pre-recorded track are identical.

3. A method of preventing a duplex recording on an information recording medium as claimed in claim 1 in which said address is recorded a plurllity of times on the pre-recorded tracks so that address values are identical in one pre-recorded track, said step of confirming the address of said first pre-recorded track comprising a substep of obtaining an address of the pre-recorded track by carrying out a majority logic operation on address values within a signal which is reproduced from the pre-recorded track.

4. A method of preventing a duplex recording on an information recording medium as claimed in claim 1 in which said information recording medium is a disc having a guide track pre-formed thereon, said address being recorded within said guide track.

5. A method of preventing a duplex recording on an information recording medium as claimed in claim 1 in which said information recording medium is a disc, said address being recorded on the pre-recorded tracks together with the information signal.

6. A method of preventing a duplex recording on an information recording medium as claimed in claim 1 in which said information recording medium is a disc, said address being recorded in at least a lead-in region and the pre-recorded tracks of the disc, said step of detecting said predetermined unrecorded track detecting the starting address of said predetermined unrecorded track with reference of a reference address which is reproduced from said lead-in region or from an arbitrary one of the pre-recorded tracks.

7. An apparatus for preventing a duplex recording on an information recording medium, said information recording medium comprising unrecorded tracks which are not recorded with an information signal and pre-recorded tracks which are pre-recorded with an information signal, said duplex recording being an operation in which an information signal is erroneously recorded on said pre-recorded tracks, said apparatus comprising:
   recording and reproducing means for recording and reproducing signals on and from said information recording medium by scanning the tracks thereof;
   means for detecting a predetermined unrecorded track having a starting address where a recording is to be started on said information recording medium;
   means for detecting a first pre-recorded track occurring after said predetermined unrecorded track based on a signal which is reproduced by said recording and reproducing means from said first pre-recorded track;
   means for confirming an address of said first pre-recorded track from consecutive addresses reproduced from signals which are reproduced by said recording and reproducing means from said first pre-recorded trac and a predetermined nmmber of pre-recorded tracks following said first pre-recorded track;
   means for controlling said recording and reproducing means to record an information signal on said predetermined unrecorded track and unrecorded tracks following said predetermined unrecorded track; and
   means for forcibly stopping the recording of the information signal by said recording and reproducing means at an unrecorded track having an address which is one less than the address of said first pre-recorded track.

8. An apparatus for preventing a duplex recording on an information recording medium as claimed in claim 7 in which said address is recorded a plurality of times on the pre-recorded tracks so that address values are identical in one pre-recorded track, said means for confirming the address of said first pre-recorded track validating an address of the pre-recorded track only when address values within a signal wiich is reproduced from the pre-recorded track are identical.

9. An apparatus for preventing a duplex recording on an information recording medium as claimed in claim 7 in which said address is recorded a plurality of times on the pre-recorded tracks so that address values are identical in one pre-recorded track, said means for confirming the address of said first pre-recorded track obtaining an address of the pre-recorded track by carrying out a majority logic operation on address values within a signal which is reproduced from the pre-recorded track.

10. An apparatus for preventing a duplex recording on an information recording medium as claimed in claim 7 in which said information recording medium is a disc having a guide track pre-formed thereon, said address being recorded within said guide track.

11. An apparatus for preventing a duplex recording on an information recording medium as claimed in claim 7 in which said information recording medium is a disc, said address being recorded on the pre-recorded tracks together with the information signal.

12. An apparatus for preventing a duplex recording on an information recording medium as claimed in claim 7 in which said information recording medium is a disc, said address being recorded in at least a lead-in region and the pre-recorded tracks of the disc, said means for detecting said predetermined unrecorded track detecting the starting address of said predetermined unrecorded track with reference of a reference address which is reproduced by said recording and reproducing means from said lead-in region or from an arbitrary one of the pre-recorded tracks.

* * * * *